United States Patent
Lee

(10) Patent No.: US 7,953,986 B2
(45) Date of Patent: *May 31, 2011

(54) METHOD OF PROTECTING DATA SAVED TO RECORDING MEDIUM AND DATA STORAGE APPARATUS ADOPTING METHOD

(75) Inventor: Ki-ju Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 179 days.

This patent is subject to a terminal disclaimer.

(21) Appl. No.: 12/314,782

(22) Filed: Dec. 16, 2008

(65) Prior Publication Data

US 2009/0106562 A1    Apr. 23, 2009

Related U.S. Application Data

(63) Continuation of application No. 10/793,272, filed on Mar. 5, 2004, now Pat. No. 7,472,287.

(30) Foreign Application Priority Data

Mar. 7, 2003    (KR) .................................. 2003-14478

(51) Int. Cl.
    G06F 12/14    (2006.01)
    G06F 7/04     (2006.01)
    G06F 12/00    (2006.01)
(52) U.S. Cl. ............ 713/193; 713/189; 726/26; 726/27; 711/4; 711/100
(58) Field of Classification Search .................. None
    See application file for complete search history.

(56) References Cited

U.S. PATENT DOCUMENTS

| 5,428,685 A | 6/1995 | Kadooka et al. |
| 5,937,164 A | 8/1999 | Mages et al. |
| 6,011,849 A | 1/2000 | Orrin |

(Continued)

FOREIGN PATENT DOCUMENTS

JP    08-124305    5/1996

(Continued)

OTHER PUBLICATIONS

Korean Office Action for Application 10-2003-0014478, May 17, 2004.

(Continued)

*Primary Examiner* — Ponnoreay Pich
(74) *Attorney, Agent, or Firm* — Staas & Halsey LLP

(57) ABSTRACT

An apparatus, a computer-readable recording medium, and a method of controlling data recording and reproducing to and from a disk. Controlling the recording of data includes storing password information set in a recording mode and key information to a first area of the disk, encrypting location information of the first area, storing the encrypted location information to a second area of the disk, encrypting desired data and an address of the desired data using the key information, and recording the encrypted data at the encrypted address. Controlling the reproducing of data includes, when the password information is received in a reproducing mode, reading the encrypted location information saved to the second area of the disk, decrypting the encrypted location information of the first area, reading the password information saved to the first area, comparing the received password information with the read password information, and when the received password information is identical to the read password information, reading the key information saved to the first area and reproducing the desired data and the address using the read key information.

20 Claims, 3 Drawing Sheets

U.S. PATENT DOCUMENTS

| | | | |
|---|---|---|---|
| 6,141,483 | A | 10/2000 | Yamada et al. |
| 6,681,304 | B1 | 1/2004 | Vogt et al. |
| 6,687,826 | B1 | 2/2004 | Owa |
| 6,832,319 | B1 | 12/2004 | Bell et al. |
| 6,957,343 | B2 | 10/2005 | Ripley et al. |
| 7,051,213 | B1 | 5/2006 | Kobayashi et al. |
| 7,124,301 | B1 | 10/2006 | Uchida |
| 7,185,205 | B2 | 2/2007 | Launchbury et al. |
| 7,245,719 | B2 | 7/2007 | Kawada et al. |
| 2001/0049662 | A1 | 12/2001 | Linnartz |
| 2002/0046176 | A1 | 4/2002 | Seo et al. |
| 2002/0136118 | A1 | 9/2002 | Takahashi |
| 2002/0154771 | A1 | 10/2002 | Sako et al. |
| 2003/0070083 | A1 | 4/2003 | Nessler |

FOREIGN PATENT DOCUMENTS

| | | |
|---|---|---|
| JP | 09-306097 | 11/1997 |
| KR | 2000-0061704 | 10/2000 |
| KR | 2002-0073810 | 9/2002 |

OTHER PUBLICATIONS

Mihai Budiu, "A Dual—Disk file System: ext4", Apr. 16, 1997, pp. 1-17.

Bruce Schneier, "Applied Cryptography, second edition", 1996, pp. 13-15.

Office Action, mailed Feb. 28, 2008, in U.S. Appl. No. 10/793,272 (8 pp.).

Notice of Allowance, mailed Aug. 22, 2008, in U.S. Appl. No. 10/793,272 (11 pp.).

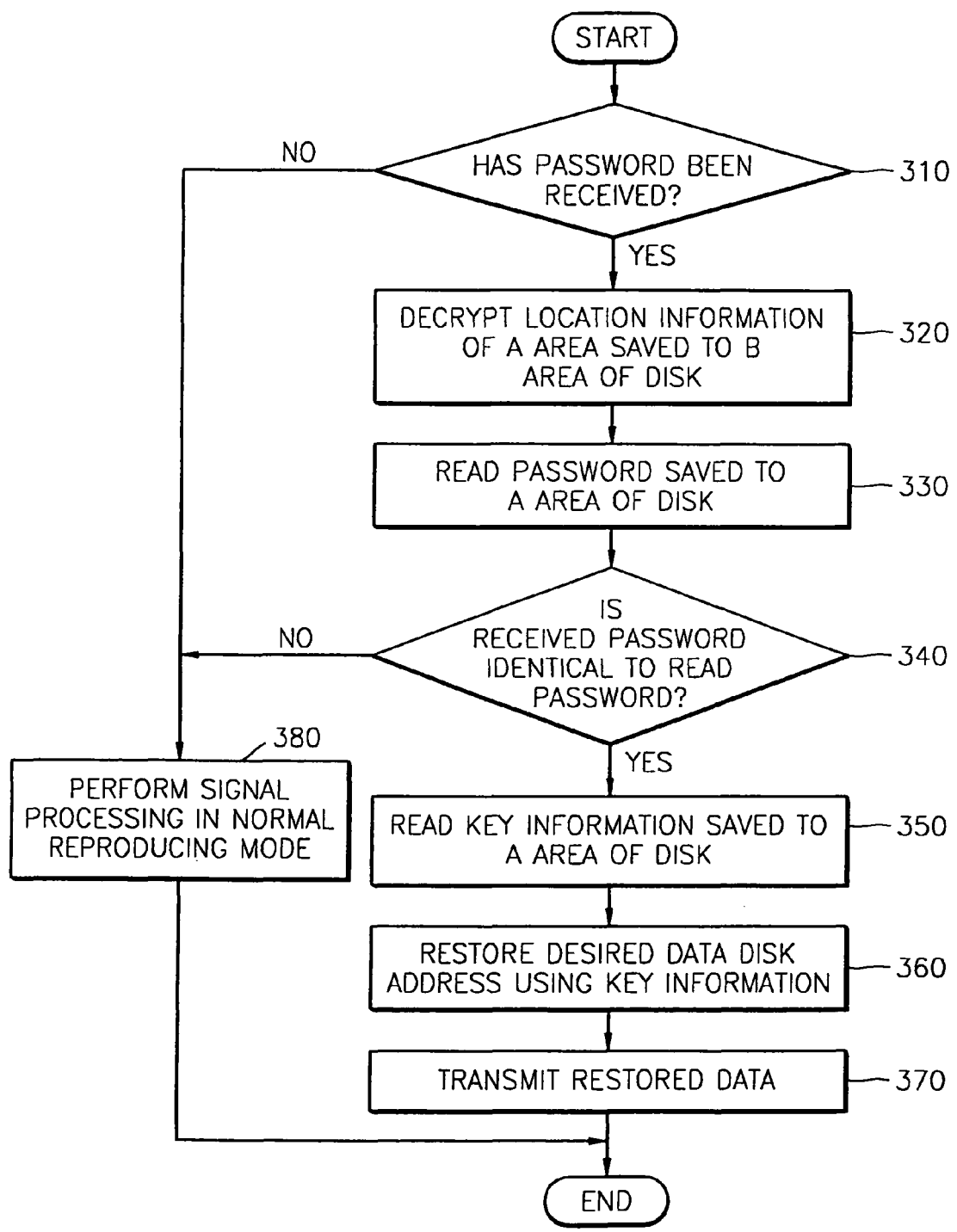

METHOD OF PROTECTING DATA SAVED TO RECORDING MEDIUM AND DATA STORAGE APPARATUS ADOPTING METHOD

CROSS-REFERENCE TO RELATED APPLICATIONS

This application is a Continuation Application of U.S. Ser. No. 10/793,272, filed on Mar. 5, 2004 now U.S. Pat. No. 7,472,287, and claims the benefit of Korean Patent Application No. 2003-14478 filed on Mar. 7, 2003 in the Korean Intellectual Property Office, the entire disclosures of which are incorporated herein by reference.

BACKGROUND OF THE INVENTION

1. Field of the Invention

The present invention relates to a method and an apparatus for controlling data recording and/or reproducing operations, and, more particularly, to a method of protecting data saved to a recording medium and a disk drive using the method, in which unauthorized access to data saved to the recording medium is prevented using password-locked disk formatting.

2. Description of the Related Art

In general, an optical disk is classified according to its purpose as (1) a read-only optical disk, such as a compact disc-read only memory (CD-ROM), (2) a recordable optical disk, such as a compact disc-recordable (CD-R), and (3) a rewritable optical disk, such as a compact disc-rewritable (CD-RW). Each kind of optical disk has a distinctive purpose and has been widely used in recent years. With the development of high-capacity disks, such as digital versatile disks (DVDs), optical disks have offered the ability to record not only PC data but also various kinds of video or audio data.

However, because access to data saved to the optical disks is generally available to everyone, data saved to the optical disks may not be protected from illegal copying, and security and integrity thereof cannot be guaranteed.

In an attempt to solve such problems, Korean Laid-Open Patent Application No. 2001-55057, titled "Method of Restricting Access to Recordable Optical Disks," discloses recording a password to a specific area of an optical disk when data are recorded on the optical disk, comparing a password that is input when data saved to the optical disk are reproduced with the password recorded to the specific area of the optical disk, and allowing access to the data saved on the optical disk only when the received password is identical to the recorded password.

However, because data are recorded on the optical disk without encryption, if the password recorded to the specific area of the optical disk is accessed and decrypted, the data saved to the optical disk may be easily accessed.

SUMMARY OF THE INVENTION

The present invention provides a method of protecting data saved to a recording medium and a disk drive using the method, in which key information is saved to a specific area of a disk, received data and its address are encrypted using the key information, and the encrypted data and address are saved to the disk. The saved data are reproduced in a reproducing mode using location information of a password, the password, and the key information.

According to an aspect of the present invention, there is provided a method of controlling data recording and/or reproducing to and from a disk, the method including: controlling recording of data, including storing password information set in a recording mode and key information to a first area of the disk, encrypting location information of the first area, storing the encrypted location information to a second area of the disk, encrypting desired data and an address of the desired data using the key information, and recording the encrypted data at the encrypted address; and controlling reproducing of data, including, when the password information is received in a reproducing mode, reading the encrypted location information saved to the second area of the disk, decrypting the encrypted location information of the first area, reading the password information saved to the first area, comparing the received password information with the read password information, and when the received password information is identical to the read password information, reading the key information saved to the first area and reproducing the desired data and the address using the read key information.

According to another aspect of the present invention, there is provided a computer-readable recording medium having preset password information and key information saved to a first area, and encrypted location information of the first area saved to a second area, wherein data and a corresponding address are encrypted using the key information and recorded.

According to another aspect of the present invention, there is provided an apparatus to record and reproduce data, the apparatus including a disk storing data; a spindle motor rotating the disk; a pickup recording data, to and reading data from, the disk; a sled motor moving the pickup; a servo control unit controlling a rotating speed of the disk and movement of the pickup; a signal processing circuit performing signal processing according to a recording mode or a reproducing mode; and a controller controlling a recording process and a reproducing process. The recording process includes storing password information set in the recording mode and key information to a first area of the disk, encrypting location information of the first area, storing the encrypted location information to a second area of the disk, encrypting desired data and an address of the desired data using the key information, and recording the encrypted data at the encrypted address. The reproducing process includes, when the password information is received in the reproducing mode, reading the encrypted location information saved to the second area of the disk, decrypting the encrypted location information of the first area, reading the password information saved to the first area, comparing the received password information with the read password information, and when the received password information is identical to the read password information, reading the key information saved to the first area and reproducing the desired data and the address using the read key information.

According to another aspect of the present invention, there is provided an apparatus to record and reproduce data, the apparatus including a disk storing data, and a controller controlling a data recording process and a data reproducing process. The data recording process includes storing password information set in the recording mode and key information to a first area of the disk, encrypting location information about the first area, storing the encrypted location information to a second area of the disk, encrypting desired data and an address of the desired data using the key information, and recording the encrypted data at the encrypted address. The reproducing process includes, when the password information is received in the reproducing mode, reading the encrypted location information saved to the second area of the disk, decrypting the encrypted location information about the first area, reading the password information saved to the first area, comparing the received password information with the read password information, and when the received password information is identical to the read password information, reading the key information saved to the first area and reproducing the desired data and the address using the read key information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart of control of a data decoding operation according to the embodiment of the present invention.

DETAILED DESCRIPTION OF THE PREFERRED EMBODIMENT

Figure 1:
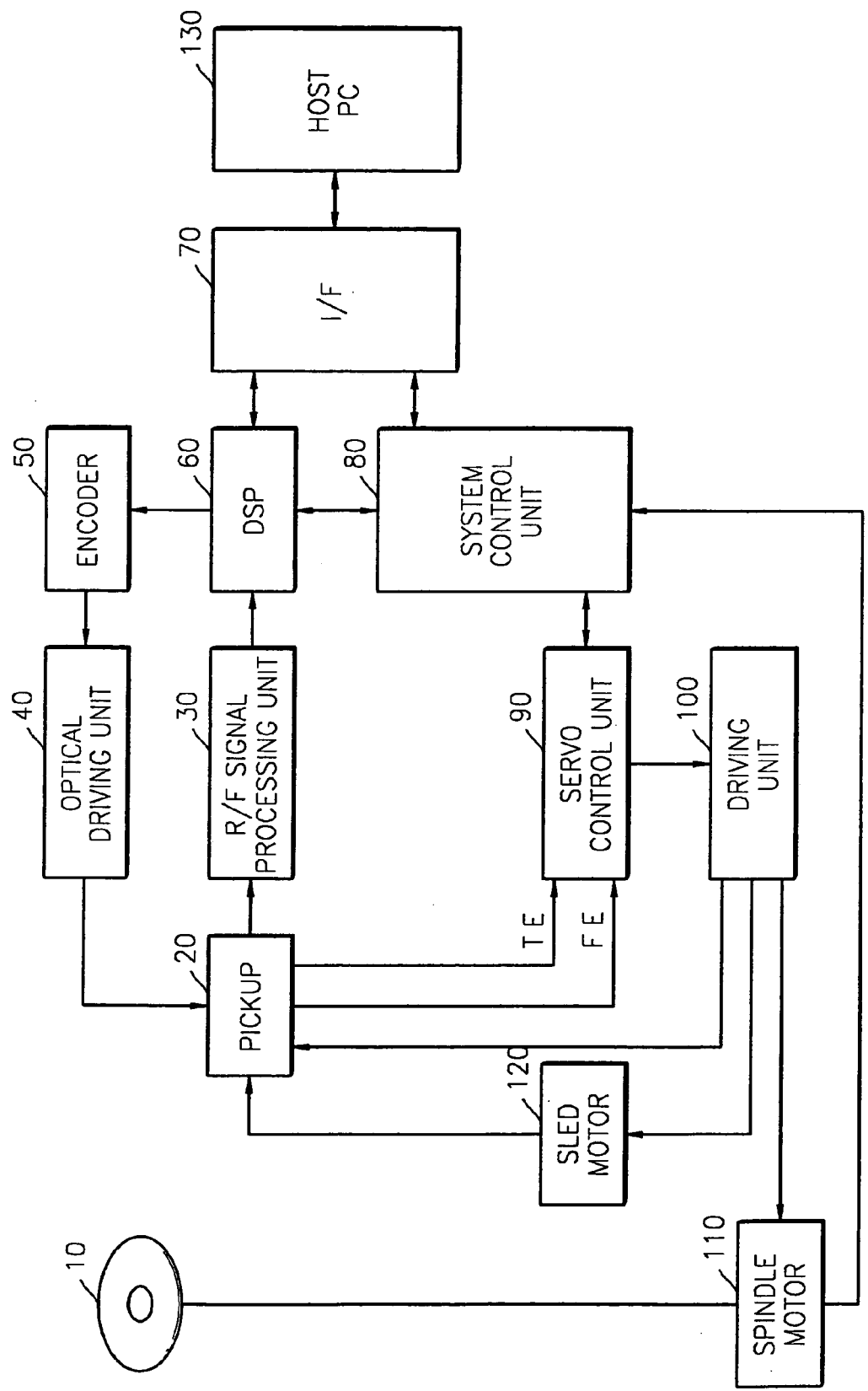
FIG. 1 illustrates a block diagram of a disk drive that protects data saved to a recording medium according to an embodiment of the present invention.

Reference will now be made in detail to the embodiment of the present invention, examples of which are illustrated in the accompanying drawings, wherein like reference numerals refer to the like elements throughout. The embodiment is described below to explain the present invention by referring to the figures.

As shown in FIG. 1, a disk drive according to the embodiment of the present invention includes a disk 10, a pickup 20, an R/F signal processing unit 30, an optical driving unit 40, an encoder 50, a digital signal processing unit DSP 60, an interface circuit I/F 70, a system control unit 80, a servo control unit 90, a driving unit 100, a spindle motor 110, and a sled motor 120.

Hereinafter, a circuit incorporating the R/F signal processing unit 30, the encoder 50, the digital signal processing unit DSP 60, and the interface circuit I/F 70 will be referred to as a signal processing circuit.

The pickup 20 includes a laser diode (not shown), a plurality of photodiodes (not shown), optical lenses (not shown), and an actuator (not shown) for moving the optical lenses in horizontal/vertical directions. The pickup 20 projects an optical signal onto the disk 10, and detects the optical signal reflected from the disk 10. In particular, the plurality of photodiodes combines reflected optical signals and generates a tracking error signal TE and a focus error signal FE used for servo control and signal processing, respectively.

The R/F signal processing unit 30 converts the signal that is generated by the pickup 20 into a binary signal after equalizing the signal from the pickup 20, and outputs the binary signal to the digital signal processing unit DSP 60.

In a recording mode, the optical driving unit 40 outputs an optical driving signal to the pickup 20 according to an input signal. In a reproducing mode, the optical driving unit 40 outputs the optical driving signal used to generate a laser signal of a predetermined power and sends the optical driving signal to the pickup 20.

The encoder 50 reconverts data, which have been converted into a recording format by the digital signal processing unit DSP 60, into a bit stream and outputs the bit stream to the optical driving unit 40.

The digital signal processing unit DSP 60 converts the binary signal input from the R/F signal processing unit 30 to the original signal in response to an internal phase-locked clock signal. Here, the binary signal is converted to data and its address using key information read from a specific area of the disk 10. In the recording mode, the digital signal processing unit DSP 60 converts input digital data into encrypted data using key information, adds an error correction code (ECC) to the encrypted data, and converts the encrypted data with the ECC into a recording format.

By using the tracking error signal TE or the focus error signal FE, the servo control unit 90 generates a driving voltage for the actuator of the pickup 20 to move the pickup 20 in horizontal/vertical directions and generates a driving voltage for the sled motor 120 to move the pickup 20 to a target track in seek mode. Also, the servo control unit 90 generates a driving voltage for the spindle motor 110 to drive the spindle motor 110 at a target rotating speed that is set by the system control unit 80.

The driving unit 100 generates driving currents to drive the spindle motor 110 and the sled motor 120 according to the generated driving voltages and generates a driving current for the actuator of the pickup 20 to perform focusing and tracking controls for the optical lenses of the pickup 20.

The interface circuit I/F 70 is connected to a host PC 130 for data receiving and transmitting operations.

The system control unit 80 controls the disk drive so that the disk drive can be operated in a mode set by a key input. In particular, when the password and a recording command are received through the interface circuit I/F 70 from the host PC 130, the system control unit 80 controls a recording process of generating random key information, storing the received password and key information in a first area of the disk 10, encrypting location information of the first area, recording the encrypted location information to a second area of the disk 10, reproducing desired data and its address using the key information, and recording the reproduced address in the first area and recording the encrypted data to its address.

When the password and a reproducing command are received through the interface circuit I/F 70 from the host PC 130, the system control unit 80 controls a reproducing process of reading data saved to the second area of the disk 10, decrypting the location information of the first area, decrypting data saved to the first area of the disk 10, reading the password saved to the first area of the disk 10, comparing the received password with the read password, and if the received password is identical to the read password, reading the key information saved to the first area of the disk 10 and reproducing the desired data at the address using the read key information.

Figure 2:
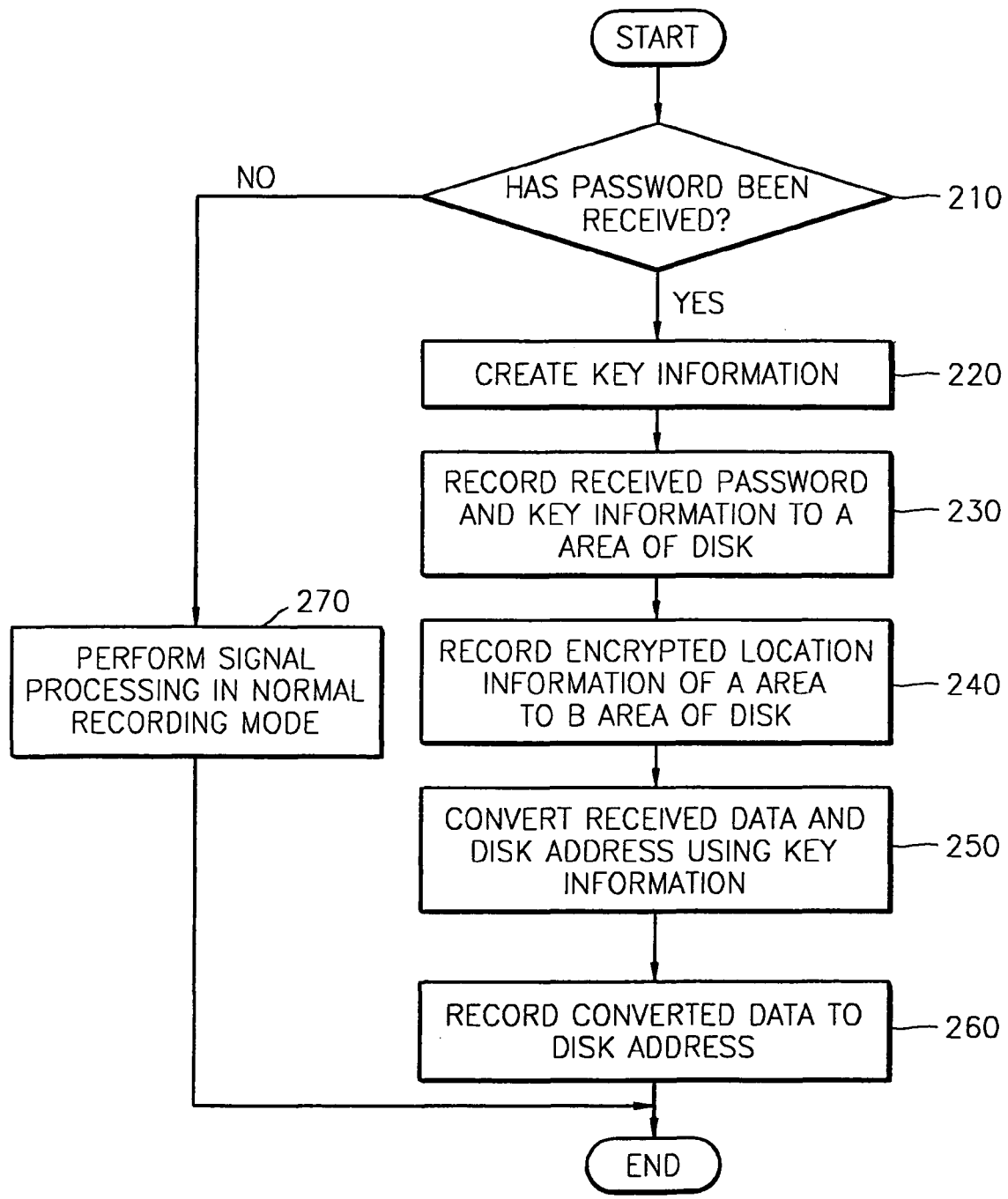
FIG. 2 is a flowchart of control of data encrypting and recording operations according to the embodiment of the present invention.

Hereinafter, a method of protecting data saved to a recording medium will be described with reference to FIGS. 2 and 3. FIG. 2 applies to the recording mode and FIG. 3 applies to the reproducing mode.

Referring to FIG. 2, at operation 210, the system control unit 80 of the disk drive determines whether a password set by the host PC 130 and a recording command are received through the interface circuit I/F 70.

If the password has not been received, the process proceeds to operation 270. At operation 270, the system control unit 80 controls the digital signal processing unit DSP 60 to perform signal processing in a normal recording mode in which password recording and data encrypting are not performed.

If the password has been received, the system control unit 80 creates random key information at operation 220. The key information is used to encrypt the desired data and its address.

Then, at operation 230, the system control unit 80 sends a seek command to the servo control unit 90 to move the pickup 20 to an A area of the disk 10, and sends a recording command to the digital signal processing unit DSP 60 to record the received password and key information to the A area of the disk 10.

Next, at operation 240, the system control unit 80 sends the seek command to the servo control unit 90 to move the pickup 20 to a B area of the disk 10, and sends the recording command to the digital signal processing unit DSP 60 to encrypt location information of the A area of the disk 10 and record the encrypted location information to the B area of the disk 10.

At operation 250, the system control unit 80 controls the digital signal processing unit DSP 60 to encrypt the desired data and its address using the key information. In the embodiment of the present invention, the desired data and its address are encrypted by performing an XOR operation on the desired data and the key information and on the address and the key information, respectively.

At operation 260, the encrypted data are recorded to its address via a laser signal generated by the optical driving unit 40 using the key information.

Referring to FIG. 3, at operation 310, the system control unit 80 of the disk drive determines whether a password and a reproducing command are received through the interface circuit I/F 70 from the host PC 130.

If the password has not been received, the process proceeds to operation 380. At operation 380, the system control unit 80 controls the digital signal processing unit DSP 60 to perform signal processing in a normal reproducing mode in which data decryption is not performed.

At operation 320, if the password has been received, the system control unit 80 sends a seek command to the servo control unit 90 to move the pickup 20 to the B area of the disk 10, and controls the pickup 20 and the digital signal processing unit DSP 60 to read and decrypt the location information of the A area, which has been encrypted and saved to the B area of the disk 10.

Then, at operation 330, the system control unit 80 sends the seek command to the servo control unit 90 to move the pickup 20 to the A area of the disk 10, and controls the pickup 20 and the digital signal processing unit DSP 60 to read the password saved to the A area of the disk 10.

At operation 340, the system control unit 80 determines whether the received password is identical to the read password.

If the received password is not identical to the read password, the system control unit 80 controls the digital signal processing unit DSP 60 at operation 380 to perform signal processing in the normal reproducing mode in which data decryption is not performed.

If the received password is identical to the read password, the system control unit 80 controls the digital signal processing unit DSP 60 to read the key information saved to the A area of the disk 10 at operation 350 and reproduce the desired data at the address using the read key information at operation 360. In the embodiment of the present invention, the desired data and its address are decrypted by performing an XOR operation on the desired data and the key information and on the address and the key information, respectively.

At operation 370, the decrypted data are transmitted to the host PC 130 through the interface circuit I/F 70.

Conventionally, a password is saved to a specific area of a disk and the authenticity of a received password is determined in a reproducing mode. However, according to the embodiment of the present invention, data saved to the recording medium are protected more safely by storing a password and key information to a specific area of a disk, encrypting the location information of the specific area of the disk, recording the encrypted location information to another specific area of the disk, encrypting data and its address using the password and key information, recording the encrypted data to its address on the disk, and decrypting the encrypted data at the address using the location information, the password, and the key information in the reproducing mode.

The present invention may be embodied as a method, an apparatus, and a system. When the present invention is implemented as software, it is formed of code segments for executing requisite operations. Programs or code segments can be saved to a computer-readable medium or transmitted through computer data signals combined with carrier waves in a transmission medium or communication network. The computer-readable medium is a medium that can store or transmit data, including, but not limited to, electric circuits, semiconductor memory devices, ROMs, flash memories, erasable ROMs, floppy disks, optical disks, hard disks, optical fiber media, radio frequency (RF) networks, etc. The computer data signals can be transmitted through transmission media such as electric network channels, optical fibers, air, electric fields, RF networks, etc.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of recording data to a storage device, the method comprising:
    storing password information set in a recording mode and key information to a first area of the storage device;
    encrypting location information of the first area;
    storing the encrypted location information to a second area of the storage device;
    encrypting desired data and an address of the desired data using the key information; and
    recording the encrypted desired data at the encrypted address.

2. The method of claim 1, wherein the storage device includes a memory device.

3. The method of claim 1, wherein the storage device includes a semiconductor memory device.

4. The method of claim 1, wherein the storage device includes a solid state device.

5. The method of claim 1, wherein the key information is generated randomly.

6. The method of claim 1, wherein the encrypting of the desired data and the address comprises: performing an XOR operation on the desired data and the key information and on the address and the key information, respectively.

7. A method of reproducing data from a storage device, the method comprising:
    reading, when password information is received in a reproducing mode, encrypted location information saved to an area of the storage device;
    decrypting the encrypted location information;
    reading password information saved to the decrypted location information;
    comparing the received password information with the read password information;
    reading, when the received password information is identical to the read password information, key information saved to the decrypted location information; and restoring desired data and an address of the desired data using the read key information.

8. The method of claim 7, wherein the storage device includes a memory device.

9. The method of claim 7, wherein the storage device includes a semiconductor memory device.

10. The method of claim 7, wherein the storage device includes a solid state device.

11. A method of controlling data recording and reproducing to and from a recording medium, the method comprising:
controlling recording of data, comprising: storing password information set in a recording mode and key information to a first area of the recording medium, encrypting location information of the first area, storing the encrypted location information to a second area of the recording medium, encrypting desired data and an address of the desired data using the key information, and recording the encrypted desired data at the encrypted address; and
controlling reproducing of data, comprising: when the password information is received in a reproducing mode, reading the encrypted location information saved to the second area of the recording medium, decrypting the location information of the first area, reading the password information saved to the first area, comparing the received password information with the read password information, and when the received password information is identical to the read password information, reading the key information saved to the first area, and restoring the desired data and the address using the read key information.

12. The method of claim 11, wherein the recording medium includes a memory device.

13. The method of claim 11, wherein the key information is generated randomly.

14. The method of claim 11, wherein the controlling recording of data comprises:
determining whether the password information is received in the recording mode;
generating key information when the password information has been received;
recording the password information and the key information to the first area of the recording medium;
encrypting the location information of the first area;
recording the encrypted location information to the second area of the recording medium;
encrypting the desired data and the address using the key information; and
recording the encrypted desired data at the encrypted address on the recording medium.

15. The method of claim 11, wherein the controlling reproducing of data further comprises:
determining whether the password information is received in the reproducing mode;
reading the encrypted location information saved to the second area when the password information has been received;
decrypting the encrypted location information;
reading the password information saved to the decrypted location information of the recording medium;
comparing the received password information with the read password information;
reading the key information saved to the area corresponding to the decrypted location information when the received password information is identical to the read password information; and
restoring the desired data and the address using the read key information.

16. An apparatus for storing data, the apparatus comprising:
a recording medium storing the data; and
a controller performing a process of storing password information set in a recording mode and key information to a first area of the recording medium and a process of reproducing data,
the process of storing password information comprising:
encrypting location information of the first area;
storing the encrypted location information to a second area of the recording medium;
encrypting desired data and an address of the desired data using the key information; and
recording the encrypted desired data at the encrypted address, and the process of reproducing data comprising:
reading, when password information is received in a reproducing mode, encrypted first location information saved to a second area of the recording medium;
decrypting the encrypted first location information;
reading password information saved to the decrypted first location information;
reading, when the received password information is identical to the read password information, key information saved to the decrypted first location information; and
restoring desired data and an address of the desired data using the read key information.

17. The apparatus of claim 16, wherein the recording medium includes a semiconductor memory device.

18. The apparatus of claim 16, wherein the recording medium includes a solid state device.

19. The apparatus of claim 16, wherein the key information is generated randomly.

20. The apparatus of claim 16, wherein the controller performs an XOR operation on the desired data and the key information and on the address and the key information, respectively.

* * * * *